US011531914B2

(12) United States Patent
Soni et al.

(10) Patent No.: US 11,531,914 B2
(45) Date of Patent: Dec. 20, 2022

(54) ARTIFICIAL INTELLIGENCE (AI) BASED AUTOMATIC RULE GENERATION

(71) Applicant: ACCENTURE GLOBAL SOLUTIONS LIMITED, Dublin (IE)

(72) Inventors: Soujanya Soni, Bangalore (IN);
Madhura Shivaram, Bangalore (IN);
Aishwarya Kaliki, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 1051 days.

(21) Appl. No.: 16/105,470

(22) Filed: Aug. 20, 2018

(65) Prior Publication Data
US 2020/0057951 A1 Feb. 20, 2020

(51) Int. Cl.
*G06N 5/04* (2006.01)
*G06F 3/0486* (2013.01)
*G06F 16/22* (2019.01)

(52) U.S. Cl.
CPC ........... *G06N 5/046* (2013.01); *G06F 3/0486* (2013.01); *G06F 16/2246* (2019.01)

(58) Field of Classification Search
CPC ...... G06N 5/046; G06N 5/022; G06F 3/0486; G06F 16/2246; G06F 8/34; G06F 3/04817; G06F 16/36
See application file for complete search history.

(56) References Cited

U.S. PATENT DOCUMENTS

| 6,240,329 | B1 * | 5/2001 | Sun ................. G01R 31/2831 257/48 |
| 6,477,520 | B1 * | 11/2002 | Malaviya .............. G06Q 10/04 706/47 |
| 2006/0136194 | A1 | 6/2006 | Armstrong et al. |
| 2008/0184201 | A1 * | 7/2008 | Burns ................ G06F 9/44505 717/121 |
| 2010/0318359 | A1 * | 12/2010 | Hamaker .............. G10L 15/197 704/257 |
| 2011/0029947 | A1 * | 2/2011 | Markovic ............. G06Q 10/10 717/102 |
| 2013/0041685 | A1 | 2/2013 | Yegnanarayanan |
| 2013/0246098 | A1 * | 9/2013 | Habboush .............. G16H 40/20 705/3 |
| 2016/0026441 | A1 * | 1/2016 | Diez .................... G06F 16/367 717/104 |
| 2017/0220324 | A1 * | 8/2017 | Balasubramanian ... H04L 67/20 |

(Continued)

*Primary Examiner* — Daniel W Parcher
(74) *Attorney, Agent, or Firm* — Mannava & Kang, P.C.

(57) ABSTRACT

An AI-based rule generation system generates an ontology from user-provided information and further enables generating rules that govern processes via drag-and-drop operations by automatically generating code in the backend. The rule generation system after generating the ontology, provides access to the entities of the ontology via a drag-and-drop GUI which also includes operators required to generate the rules. The user can drag-and-drop the entity elements and the operator elements as needed onto a whitespace in addition to providing the requisite values in order to generate a rule flow. The rule flow is validated and published to an execution server for use by downstream processes. The rule generation system further includes custom functions in addition to enabling distributed knowledge base processes for generating the rules.

16 Claims, 14 Drawing Sheets

(56) References Cited

U.S. PATENT DOCUMENTS

2017/0372231 A1    12/2017  Ghatage et al.
2018/0025277 A1     1/2018  Varlamov et al.
2018/0322396 A1*   11/2018  Ahuja-Cogny .......... G06N 5/02
2018/0349351 A1*   12/2018  Singhal ................. G06F 40/289
2019/0102375 A1*    4/2019  Goulikar ................. G06N 3/02

* cited by examiner

ARTIFICIAL INTELLIGENCE (AI) BASED AUTOMATIC RULE GENERATION

BACKGROUND

The ubiquitous presence of computers in almost every home, office, factory or other establishments has led to availability of enormous quantities of data covering almost every aspect of life. When an institution using the computers can have libraries of millions of programs which can collectively contain billions of lines of source code. If a change occurs in the functioning of the institution, then corresponding changes need to occur to the programming code in order to address the change in the functioning of the institution. For example, changes such as but not limited to, addition of a new error message within the computer system or changes to customer numbers or addition of newer currencies etc. can require changes to program code of the computer systems within the institution. Similarly, when writing new programs, existing programming code configured to perform similar functions may be reused. Thus, in order to automate tasks via computing systems copious programming code needs to be generated and maintained by different programmers.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
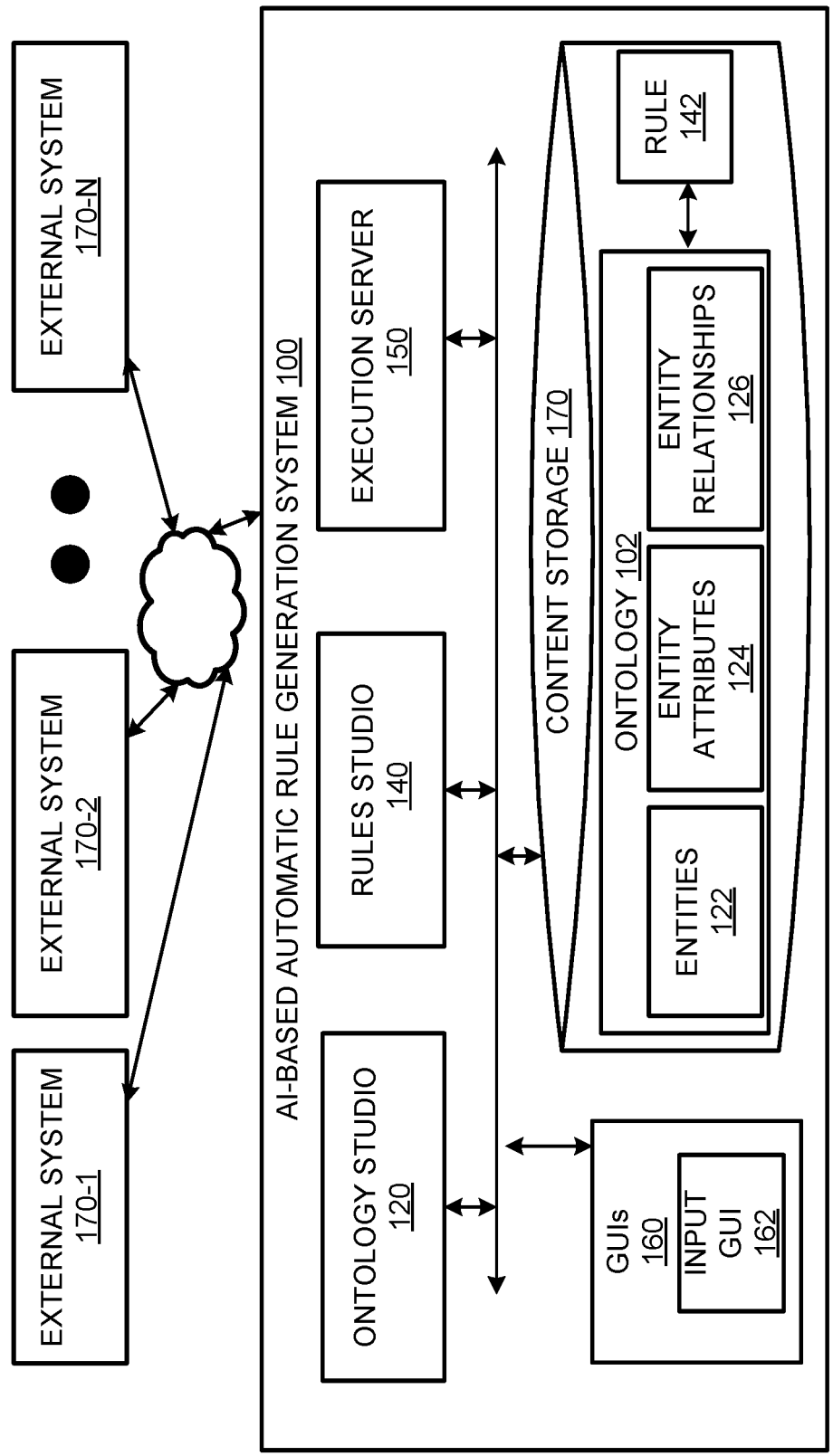
FIG. 1 shows a block diagram of an AI-based automatic rule generation system in accordance with one example.

For simplicity and illustrative purposes, the present disclosure is described by referring mainly to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

According to one or more examples described herein, an AI-based automatic rule generation system that enables a user to access ontologies and define ontology-based rule flows visually. The rule flows are automatically converted into code modules that can be executed by computing systems. The ontology generated by the rule generation system generally pertains to a specific domain and includes a hierarchical structure of entities as established by the relationships between the entities. An entity can be a singular, individual object that can have defined relationships with other entities. The entity can be defined by attributes having various data formats. In an example, the attributes can take the form of name-value pairs. Different entities can have different attributes. An entity map or an ontology map can show the hierarchical relationships between entities of the ontology.

An ontology studio included in the rule generation system receives the user-provided information for generating the ontology either via various input GUIs or via a file upload. The information can include the entity names and other attributes in addition to defining entity relationships such as but not limited to, is-part-of etc. The ontology which is thus generated is published so that other components of the rule generation system can access the ontology.

A rules studio accesses the published ontology and makes the entities within the ontology available to the user via a drag-and-drop GUI. The user can employ the entities within the drag-and-drop GUI to build rules using user-selectable UI elements without having to write code. The rules built by the user can include deterministic rules and probabilistic rules. A deterministic rule can receive a predefined input and produces a predefined output based on a set of pre-configured conditions. A probabilistic rule enables generating an output from a received input based on probability of occurrence of one or more outcomes.

In an example, the drag-and-drop GUI includes an entity pane, an operator pane and a whiteboard. The UI elements from the entity pane and the operator pane can be dragged and dropped on to the whiteboard in order to build a rule flow. The rule flow is then validated to determine that a set of rule requirements are satisfied. The validated rule flow is then used to generate a corresponding rule. The entity pane contains entity elements which are user-selectable UI elements that can be dragged and dropped from the entity pane onto the whiteboard of the drag-and-drop GUI. Each entity element corresponds to a respective entity of the ontology. Similarly, the operator pane includes operator elements wherein each operator element corresponds to a user-selectable UI element that is representative of a particular operator. The operators can include but are not limited to, condition operators, output operators and custom action operators. An operator can be associated with a code module that executes a corresponding action. For example, the condition operator can receive one or more user input values for specific entity attributes and check if one or more conditions are satisfied. Based on the satisfaction of the condition, the rule flow can specify further steps based on the condition being true/false. Another operator can include an output operator which can be configured to receive an output. For example, textual output obtained from a particular condition operator can be stored to a variable, e.g., an entity attribute as specified in the output operator. A custom function operator is also defined which corresponds to specific functions such as but not limited to, third party functions, functions for executing AI-based tasks such as natural language processing (NLP) tasks or other domain-specific functions/tasks.

Selection of a UI element corresponding to an operator on the whiteboard can cause an input UI to be displayed. The values to be used for the operator corresponding to the UI element, such as the condition, the output or the custom operators can be entered via the input UI. The rule flow thus completed is further validated to ensure that it complies with a set of rule requirements. The rule requirements can include simple checks such as matching the data formats between the output from a condition and an entity attribute receiving the output. The rule requirement can also include complex checks such as those involved in AI-related tasks as specified further herein. The validated rule flow can be published to an execution server which provides access to the rules as web services. The rules thus generated can be accessed by one or more downstream processes e.g., robotic process automation (RPA) procedures and the like.

The rule generation system additionally implements a distributed knowledge network via enabling access to various remote processing systems. In an example, the libraries comprised in the rule generation system can further include functions which allow data to be passed to the remote processing systems. Remote processing systems can include one or more external systems operating on the same or different physical infrastructure as the rule generation system and can be configured with different software. The physical infrastructure of the external systems can be located at the same or different geographical location than the machines executing the rule generation system. The rule generation system can transmit data for processing to the external system and receiving processed output of the external system.

The rule generation system as disclosed herein provides various functionalities that improve computer systems in different ways. As mentioned herein, computer infrastructure of an institution such as a factory, university or other establishment can require building and maintaining large body of computer programming code. The rule generation system provides for an ontology studio and a rules studio for encoding visually, via drag-and-drop GUIs, knowledge of processes within computing systems and automatic rule generation from such knowledge without having to write programming code. This improves functioning of computing systems by easing the usage of computers. Moreover, the rule generation system employs AI techniques such as natural language processing (NLP) to implement probabilistic rules wherein the results from implementing the probabilistic rules depend on the likelihood of multiple outcomes.

Another technical advantage of the rule generation system is enabling access to a distributed knowledge base including disparate data sources for generation and implementation of the rules. The distributed knowledge base enables harnessing the processing capabilities of the external systems so that the functionality of the external systems need not be duplicated on the rule generation system. Furthermore, the confidentiality and/or security of the external systems is not breached as the processing of the data/internal workings of the external systems remain shielded from the rule generation system. Therefore, rules which can check for various combinations of conditions from different external systems can be configured. Such rules would not be possible to implement and the external systems would have remained disjoined in the absence of the distributed knowledge base as implemented by the rule generation system as disclosed herein.

FIG. 1 shows a block diagram of the AI-based automatic rule generation system 100 in accordance with an example disclosed herein. The rule generation system 100 includes an ontology studio 120, a rules studio 140 and an execution server 150. A content storage 170 that stores necessary data including permanent and temporary data needed for the functioning of the rule generation system 100 is also associated therewith. In addition, the rule generation system 100 can include various graphical user interfaces (GUIs) 160 that enable user interactions for the generation of ontologies, rules and the like. The rule generation system 100 may also be communicatively coupled to a plurality of external processing systems 170-1, 170-2 . . . 170-$n$ thereby enabling distributed knowledge processing in accordance with some examples disclosed herein.

The ontology studio 120 receives user-provided information regarding an ontology 102 to be built. The user can provide information for building the ontology 102 via uploading a file which includes the various entities 122, entity attributes 124 and relationships 126 between the entities 122. The file can include data for generating the ontology in the form of structured or unstructured data. For example, the file can include one or more of a flat file, a comma separated values (CSV) file, a spreadsheet, a database file and the like. In an example, the ontology studio 120 can receive the information for building the ontology 102 via one or more input GUIs which provide screens that facilitate the user to enter the information.

The ontology 102 which includes the entities 122, the entity attributes 124 and the entity relationships 126 which is generated by the ontology studio 120 is saved can be stored to the content storage 170. In an example, the ontology 102 can be provided to the user as an entity-relationship tree structure on an output GUI. In an example, the ontology 102 can be provided for download in JSON format. In addition to enabling generation of new ontologies from new information, the ontology studio 120 can also enable the users to modify or update existing ontologies via update/modify GUIs.

The rules studio 140 accesses the ontology 102 from the content storage 170 and generates rules that direct or determine process flows in accordance with examples disclosed herein. More particularly, the rules studio 140 accesses the entities 122, the attributes 124 of the entities 122 and that relationships 126 between the entities 122 and displays them within one of the GUIs 160. In an example, one of the GUIs 160 displays the entities 122 as drag-and-drop elements on a portion thereof. User selection of one or more of the entities 122 is thus enabled. An entity can be selected by the user and dragged and dropped onto another portion such as a whiteboard within one of the GUIs 160. In addition, operators for defining conditions and outputs for the conditions are also provided on one of the GUIs 160. When dragged and dropped onto the whiteboard, the operators allow the users to specify the details of the conditions and the outputs. Once the flow for the rule is completed, the flow can be validated to determine that the flow complies with a set of requirements needed for the rule generation. Any errors identified in the flow can be pointed out to the user for correction. When the flow is determined to be error-free, a rule 142 may be generated. In an example, the rule 142 can be generated in JSON format. The rule 142 thus generated can be published to the execution server 150. The execution server 150 can make the rule 142 available as a web service thereby enabling access to the rule 142 thus generated to the downstream processes. For example, domain specific robotic process automation (RPA) procedures can employ the rule 142 for automatic execution of certain processes.

The rules generated by the rules studio 140 can include deterministic rules and probabilistic rules. In the case of deterministic rules, the outputs and the conditions are predefined. However, in the case of probabilistic rules, the inputs can be variable and the outputs depend on probabilities of one or more outcomes as determined from the inputs. For example, deterministic rules can include rules that receive numerical inputs and based on the ranges of the numerical inputs, the deterministic rules can cause execution of certain pre-configured actions. On the other hand, the input to a probabilistic rule can include a block of text and based on a sentiment analysis within the block of text, probabilities of the block of text including positive, negative or neutral sentiment can be estimated using natural language processing (NLP) techniques and certain actions may be executed. Implementation of the probabilistic rules can be enabled by custom actions that are provided by the rules studio 140.

The rule generation system 100 also enables distributed knowledge management via implementing a distributed knowledge base by connecting to the plurality of external systems 170-1, 170-2 . . . 170-n. In an example, the user provided input can be transmitted to one or more of the external systems 170-1, 170-2 . . . 170-n for further processing. The results obtained at the external systems 170-1, 170-2 . . . 170-n are received at the rule generation system 100. The received results may be in a form or a data format outputted by the external systems 170-1, 170-2 . . . 170-n. In an example, the outputted data format obtained from the external systems 170-1, 170-2 . . . 170-n can be compatible or similar to the data format of the rule generation system 100. In an example, the outputted data format may not be compatible with the formats used by the rule generation system 100. In this case, the information in the outputted data format can be converted or transformed into the data format(s) employed by the rule generation system 100 for further processing. For example, the external systems 170-1, 170-2 . . . 170-n can include financial systems, human resources (HR) systems, manufacturing platforms and the like. The rule generation system 100 therefore enables generating rules using processed data from one or more of the external systems 170-1, 170-2 . . . 170-n which would otherwise not be possible separately within the individual external systems 170-1, 170-2 . . . 170-n.

Figure 2:
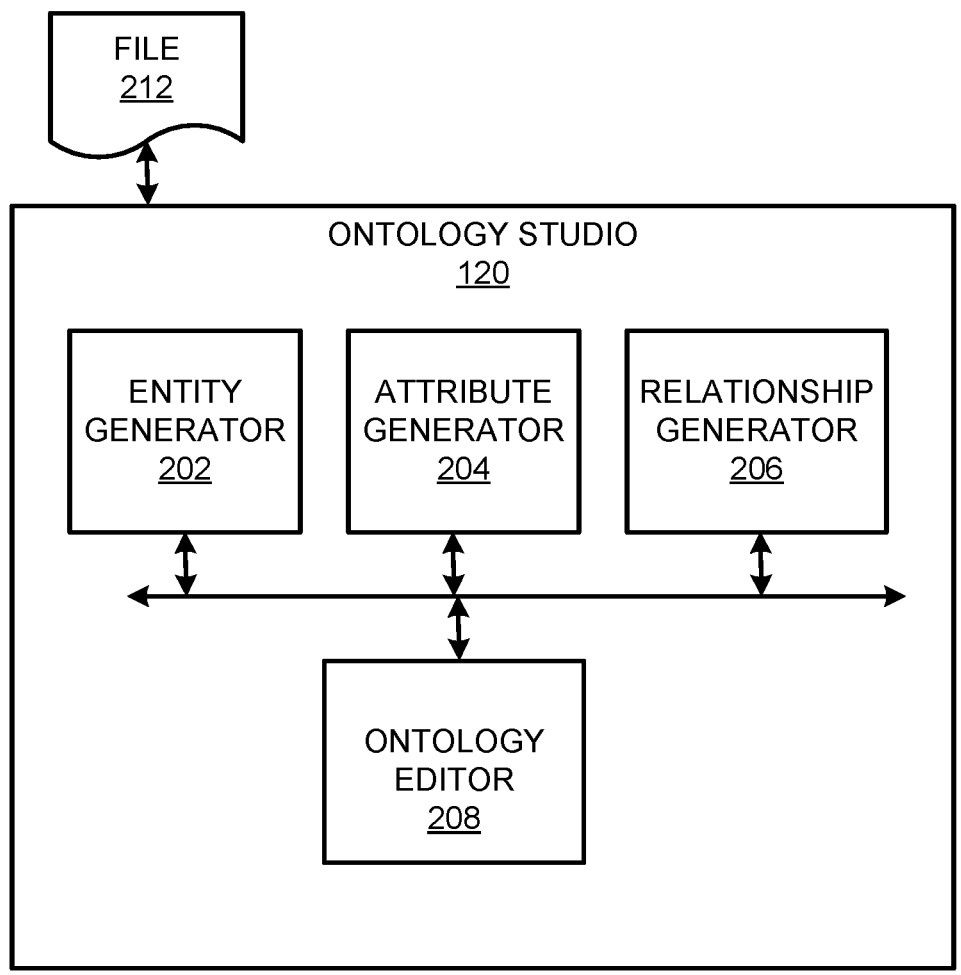
FIG. 2 shows a block diagram of an ontology studio in accordance with some examples disclosed herein.

FIG. 2 shows a block diagram of the ontology studio 120 in accordance with some examples disclosed herein. The ontology studio 120 includes an entity generator 202, an attribute generator 204 and a relationship generator 206. The ontology studio 120 additionally includes an ontology editor 208 which enables updating or editing existing ontologies. The entity generator 202 accesses the information provided by a user for the generation of the ontology 102. Various domain specific ontologies can be generated. For example, the ontology studio 120 can be used to generate ontologies for domains such as but not limited to, healthcare, finance, human resources, manufacturing, retail and the like. The information for generating the ontology 102 can be provided by the user either by uploading a file 212 or via entering the information through one of the GUIs 160 which can include an input GUI 162. The ontology 102 can include domain-specific terminology. When the file 212 is uploaded, the ontology studio 120 can parse the file to generate data tokens that are to be used for building the ontology 102.

The entity generator 202 receives information such as name of the entity, display name of the entity, number of attributes and the like from the user-provided information. In the case of a file upload, techniques such as text-matching or other string manipulation techniques can be employed to identify the various entities, entity attributes and entity relationships. After entering the entity information, the user may enter the attribute information. For each entity, the attribute generator 204 receives and stores the corresponding entity attributes. Similarly, the relationship generator 206 receives and stores the various relationships between the entities. Relationships such as but not limited to, 'cis-a', 'has-a', 'part-of' and the like can be encoded by the relationship generator 206. The entity relationships can define a hierarchical structure of the ontology 102. In an example, the ontology 102 can be generated using JSON. Upon generating the ontology 102, the ontology studio 120 can store the ontology 102 to the content storage 170 from where the ontology 102 can be made available to the various components of the rule generation system 100.

Figure 3:
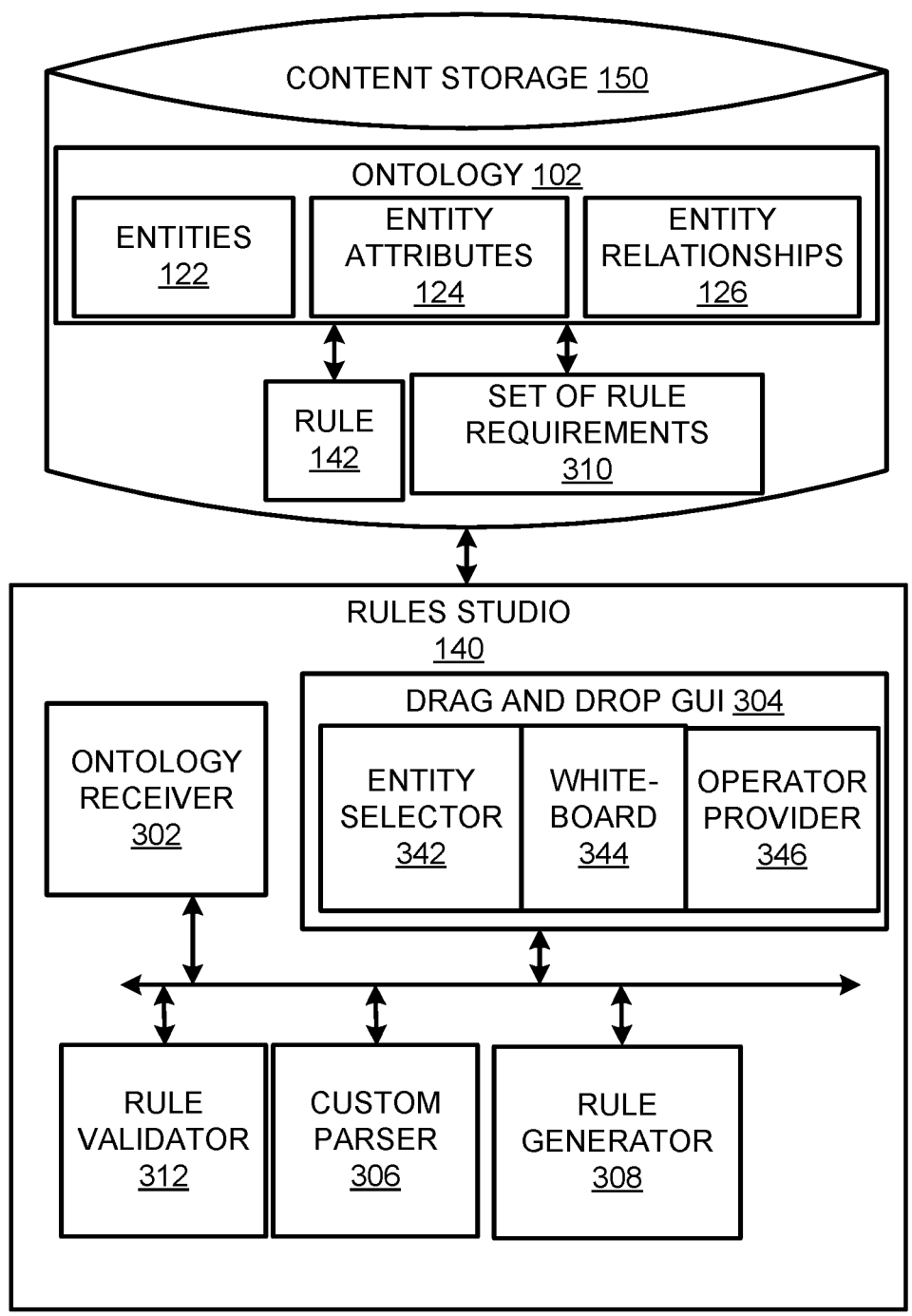
FIG. 3 shows a block diagram of a rules studio in accordance with some examples disclosed herein.

FIG. 3 shows a block diagram of the rules studio 140 in accordance with some examples disclosed herein. The rules studio 140 includes an ontology receiver 302, a drag-and-drop GUI 304, a custom parser 306 and a rule generator 308. The ontology 102 that was developed by the user by employing the ontology studio 120 is now accessed by the ontology receiver 302. In an example, the ontology 102 can be accessed as a file using the JSON script. The entities 122 within the ontology 102 are identified by an entity selector 342 included with or associated with the drag-and-drop GUI 304. The entity selector 342 displays the entities 122 as drag-and-drop elements within the drag-and-drop GUI 304. In addition, the drag-and-drop GUI 304 includes an operator provider 346 which provides various operators and outputs as drag-and-drop elements within the drag-and-drop GUI 304. The code associated with the entities 122 and the operators can be customized per the user input for further rule creation.

In order to create/generate the rule 142, the user selects one of the entity elements displayed by the entity selector 342 on one portion of the whiteboard 344. The operators, in an example, can include conditions, custom actions and outputs. Each of the operators can have a drag-and-drop element and corresponding code block associated therewith. The user can build a flow corresponding to the rule 142 to be generated by dragging and dropping the entity elements and the operators in order. The associations or connections between the entity elements and the operators can also be established by the user to complete the flow corresponding to the rule 142. In an example, the user can further supply entity attribute values or ranges for certain conditions and the like via intermediate forms which can be accessed, for example, by right clicking on a connection or an element.

When the required entities and operators are dragged and dropped onto the whiteboard 344 from the entity selector 342 and the operator provider 346 and associations therebetween are established, the rule building process may be considered as completed. It can be appreciated that the rule 142 has been built almost entirely on visual information provided by the user via drag-and-drop operations and providing values via intermediate forms without the user having to write code. When the flow corresponding to the rule 142 is considered complete and saved, the visual information is converted into JSON script by the custom parser 306 using custom grammar. In an example, the custom grammar maps the entity and operator elements to the corresponding code modules or JSON scripts which can define actions to be executed when the entity and/or operator elements are activated during the execution of the rule 142.

At this point, the rule validator 312, can validate the rule flow by ensuring that the flow complies with the set of rule requirements 310. The set of rule requirements 310 establish how the entities 122 and the operators (which include the condition and output operators) are to be connected to complete the flow. For example, the set of rule requirements 310 can establish that for a condition operator which requires at least two inputs and one produces a binary output, the appropriate number and type of variables are assigned. Similar rule requirements can be established for other operators. Any discrepancies or non-compliance can be checked and pointed out to the user for corrections during the rule flow building process. When the rule flow is validated, the rule 142 is submitted for publication. The rule generator 308 receives the code modules and outputs the code modules as the rule 142 which complies with the syntax rules and is logically accurate. The rules which are thus generated can be packaged as knowledge bases and deployed as a web services. The rules can be tested using custom data or can be used within a larger pipeline of robotic process automation (RPA).

Figure 4:
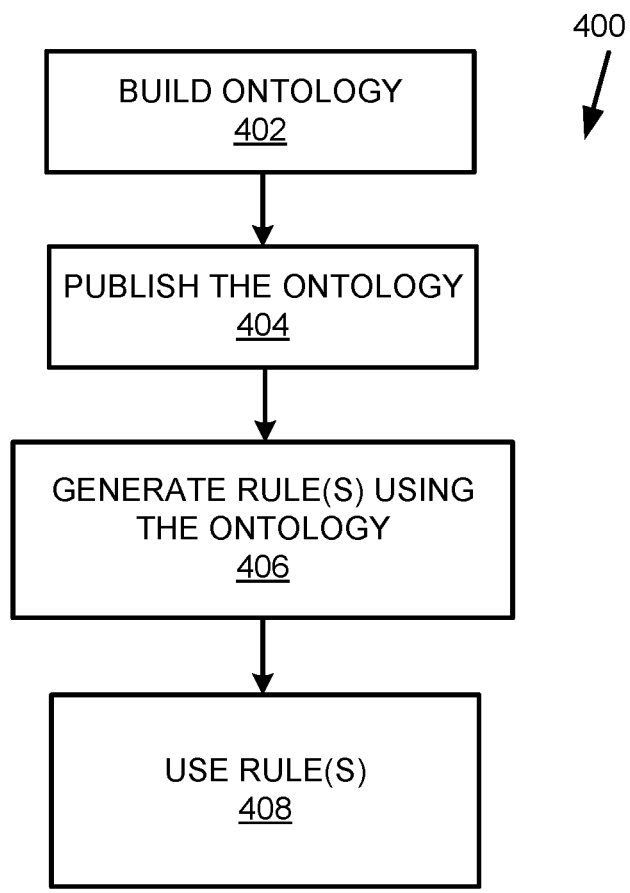
FIG. 4 shows a flowchart that details a method of automatic rule generation in accordance with the examples disclosed herein.

FIG. 4 shows a flowchart 400 that details a method of automatic rule generation in accordance with the examples disclosed herein. The method begins at 402 wherein the ontology 102 which can be associated with a domain is built. Building the ontology 102 can include generating code for the ontology 102 which connects the entities 122, the attributes 124 of the entities and the relationships 126 between the entities. In an example, the code can be generated in JSON and the file including the JSON script can be saved. The relationships 126 between the entities can establish a hierarchical structure between the entities. The ontology 102 is further published or made accessible to other components of the rule generation system 100 at 404. The rules studio 140 consumes the ontology 102 to generate one or more rules at 406. The rules thus generated can be used for testing custom data or may be used as part of larger pipeline at 408.

Figure 5:
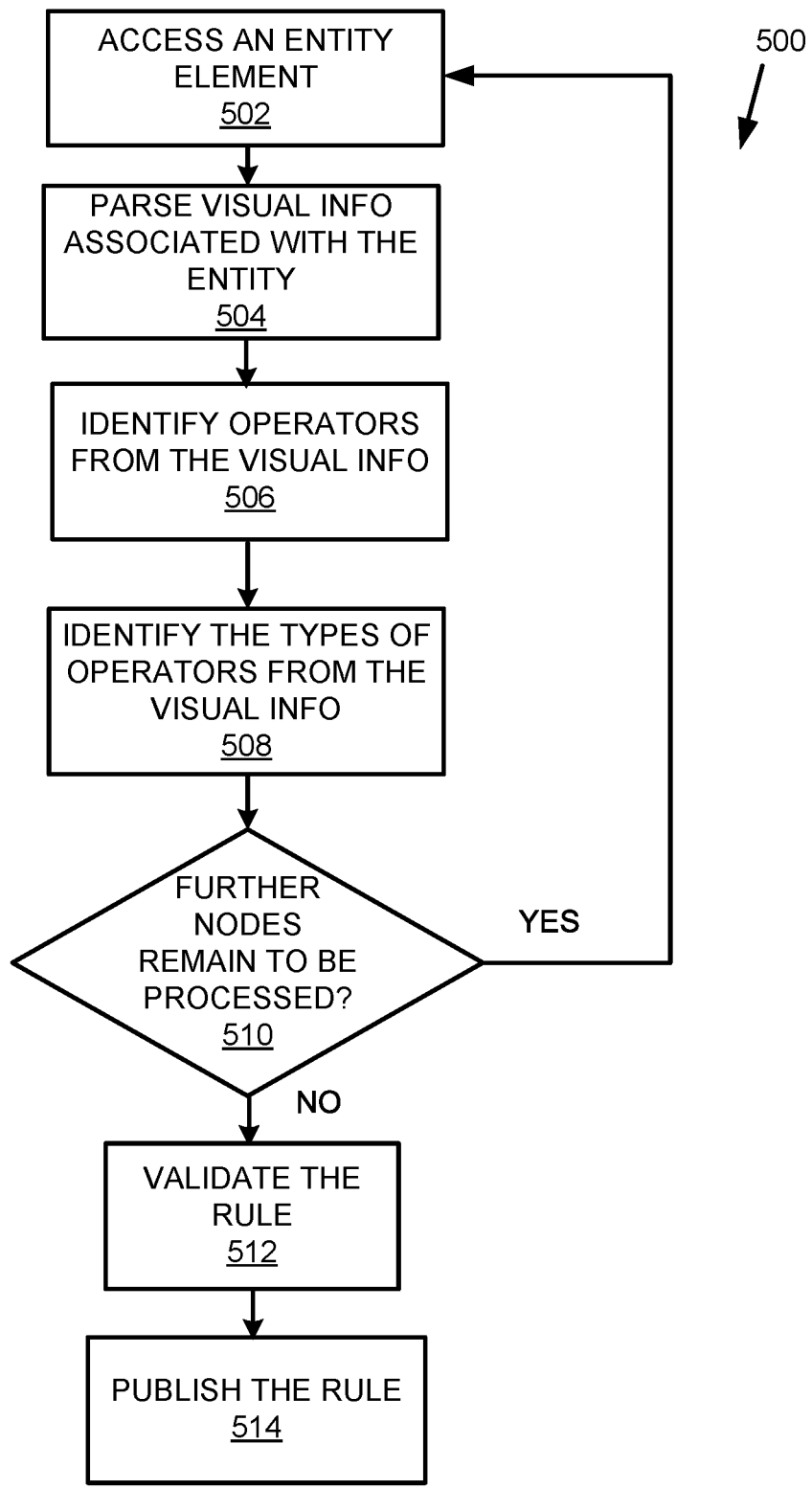
FIG. 5 shows a flowchart that details a method of generating a rule in accordance with the examples disclosed herein.

FIG. 5 shows a flowchart 500 that details a method of generating a rule in accordance with the examples disclosed herein. The rule 142 is generated from the rule flow created by the user by dragging and dropping the entity elements and the operator elements onto the whiteboard 344 and interconnecting the entity elements with the operator elements. Therefore, the rule flow generated by the user on the whiteboard 344 can include a network of nodes wherein each node corresponds to an entity element which in turn is associated with a particular entity of the ontology 102. At 502, a network node or an entity element of the flow is accessed. At 504, the visual information associated with the entity element is parsed. As mentioned above, the visual information regarding the entity element at the node can be mapped to a code module corresponding to the action to be executed for that entity. At 506, the operators associated with or connected to the entity element at the node are identified via parsing the visual information. The type of operators associated with the entity are determined from the visual information at 508. The operators can be conditional operators that specify conditions for the entity, the operators can be output operators that handle the output from the condition and the operators can include a custom action operator. If one or more conditions are specified, the entity attributes that affect the condition are obtained and the code corresponding to the condition and the entity attributes is generated by parsing via the custom grammar that maps the visual information to the code. At 510, it is determined if further nodes remain to be processed. If yes, the process returns to 502 to access the next node. If no more nodes remain for processing, the method proceeds to 512 to validate the generated code as detailed herein. The validated rule is published for consumption, for example, by downstream processes for testing data and the like at 514.

Figure 6:
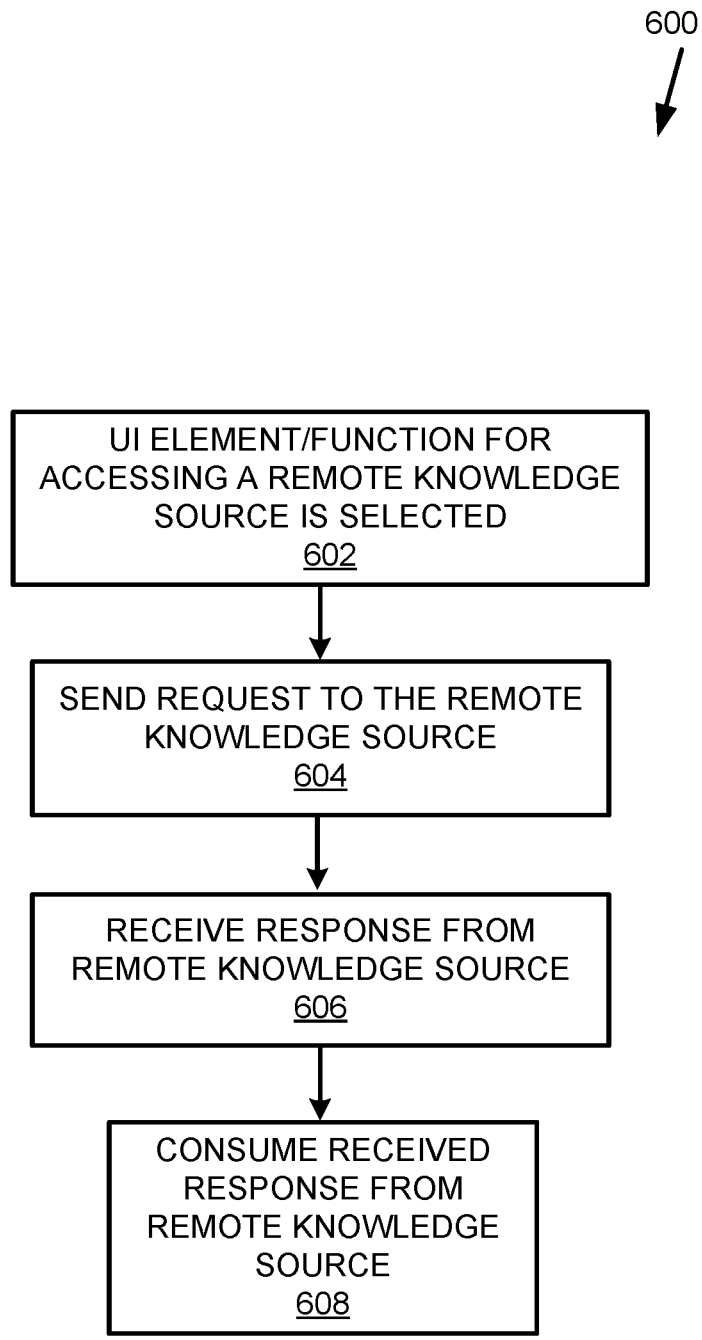
FIG. 6 shows a flowchart to implement distributed knowledge management in accordance with the examples disclosed herein.

FIG. 6 shows a flowchart 600 to implement distributed knowledge management in accordance with the examples disclosed herein. The method begins at 602 wherein a UI element or a widget or a function in the programming code of the rule generation system 100 for accessing a remote knowledge source is selected by the user. In an example, the UI element can associated as pre-built functions within one or more libraries that are accessed on the rule generation system 100. At 604, the widget/function can be configured to send a request to the remote knowledge source. In an example, the request can include data that is to be processed at the remote knowledge source. The remote knowledge source processes the input received from the rule generation system 100 and returns a response which is received at 606. The response received from the remote knowledge source can be consumed at 608 for various tasks such as, generating the ontology 102, generating the rule 142 and the like.

Figure 7:
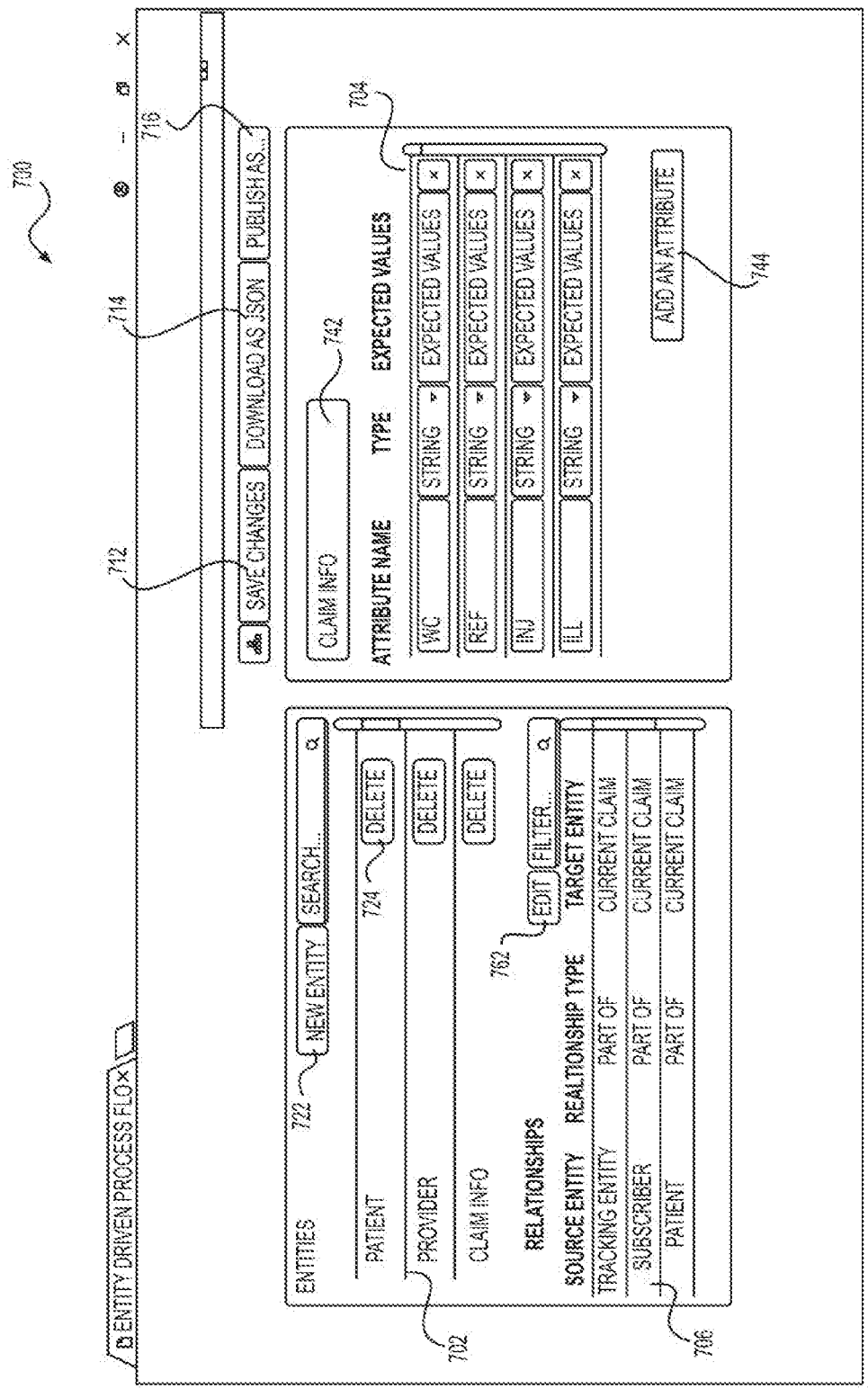
FIG. 7 shows an input/update graphical user interface (GUI) that enables a user to provide details regarding an entity to be generated in accordance with the examples disclosed herein.

FIG. 7 shows an input/update GUI 700 that enables a user to provide details regarding an entity to be generated for an ontology, for example, the ontology 102. As mentioned herein, the details regarding the entity can either be provided via uploading a file or via one of the GUIs 160. The panel 702 shows the various entities such as patient, provider, claim info, and the like within an ontology pertaining for example, to the health insurance domain. A new entity button 722 allows users to add a new entity to the ontology. Each entity has a delete button 724 which enables the user to delete the entity from the ontology. The panel 706 shows the relationships and the types of relationships between the entities in the ontology. The relationships panel 706 includes an 'edit' button 762 that enables users to edit relationships. The attributes panel 704 shows the attributes for the selected entity as shown in the text box 742. The details of the attributes such as the name of the attribute, the type of the attribute, the expected values and the like are shown in the attributes panel 704. An 'add an attribute' button 744 enables addition of newer attributes to the entity shown at 742. The 'save changes' button 712 enables saving the changes made to the ontology via one or more of the panels 702, 704 and 706. The 'download as JSON' button 714 enables downloading the ontology in the JSON format. Similarly, the 'publish as' button 716 enables publishing the ontology so that it can be accessed by the other components of the rule generation system 100.

Figure 8:
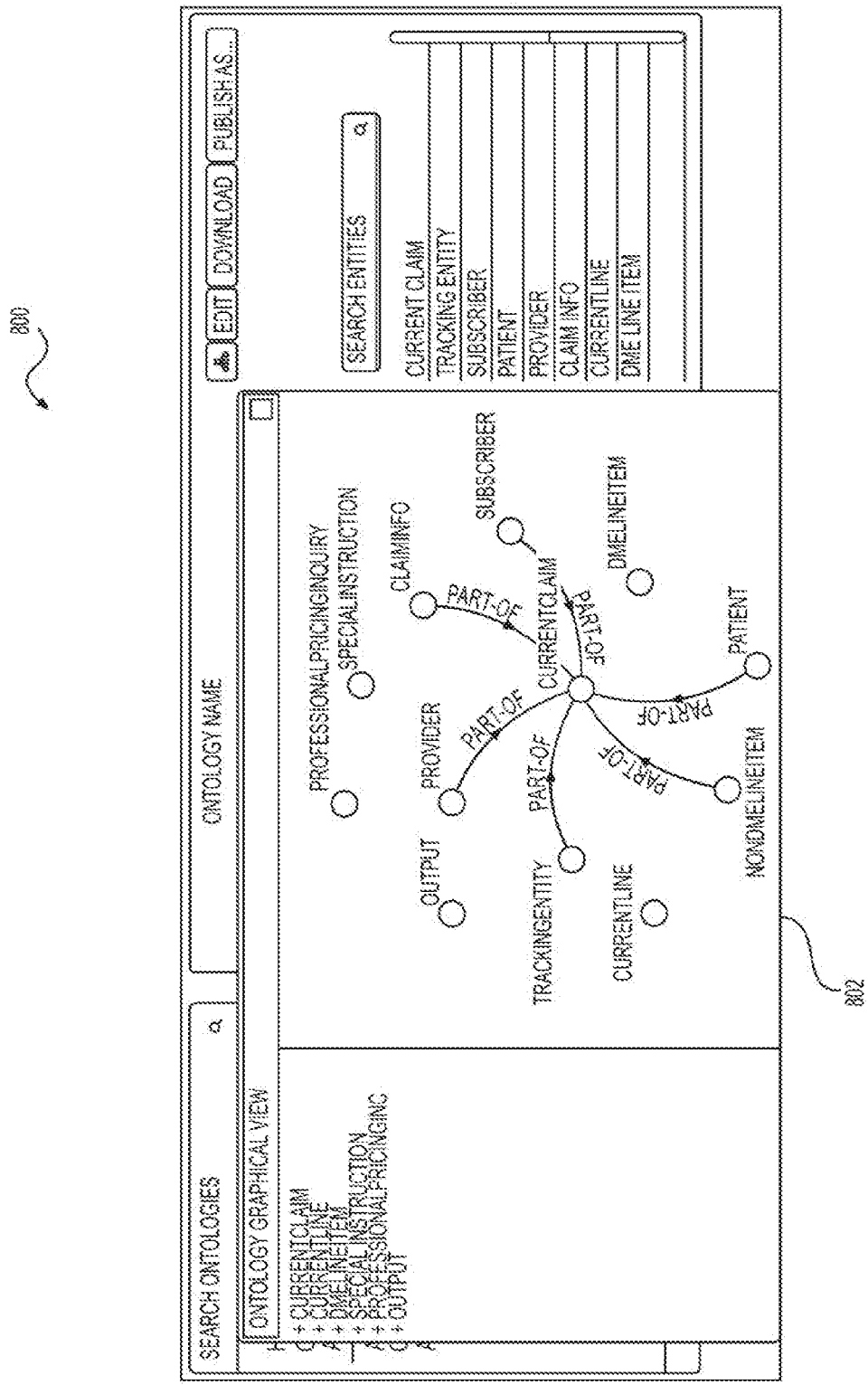
FIG. 8 shows the ontology GUI that displays a map of the ontology in accordance with the examples disclosed herein.

FIG. 8 shows the ontology GUI 800 that displays a map 802 of the ontology 102 generated in accordance with examples disclosed herein. The map 802 can be generated via the input UI 700 or via a file and shows the various relationships between the entities.

Figure 9A:
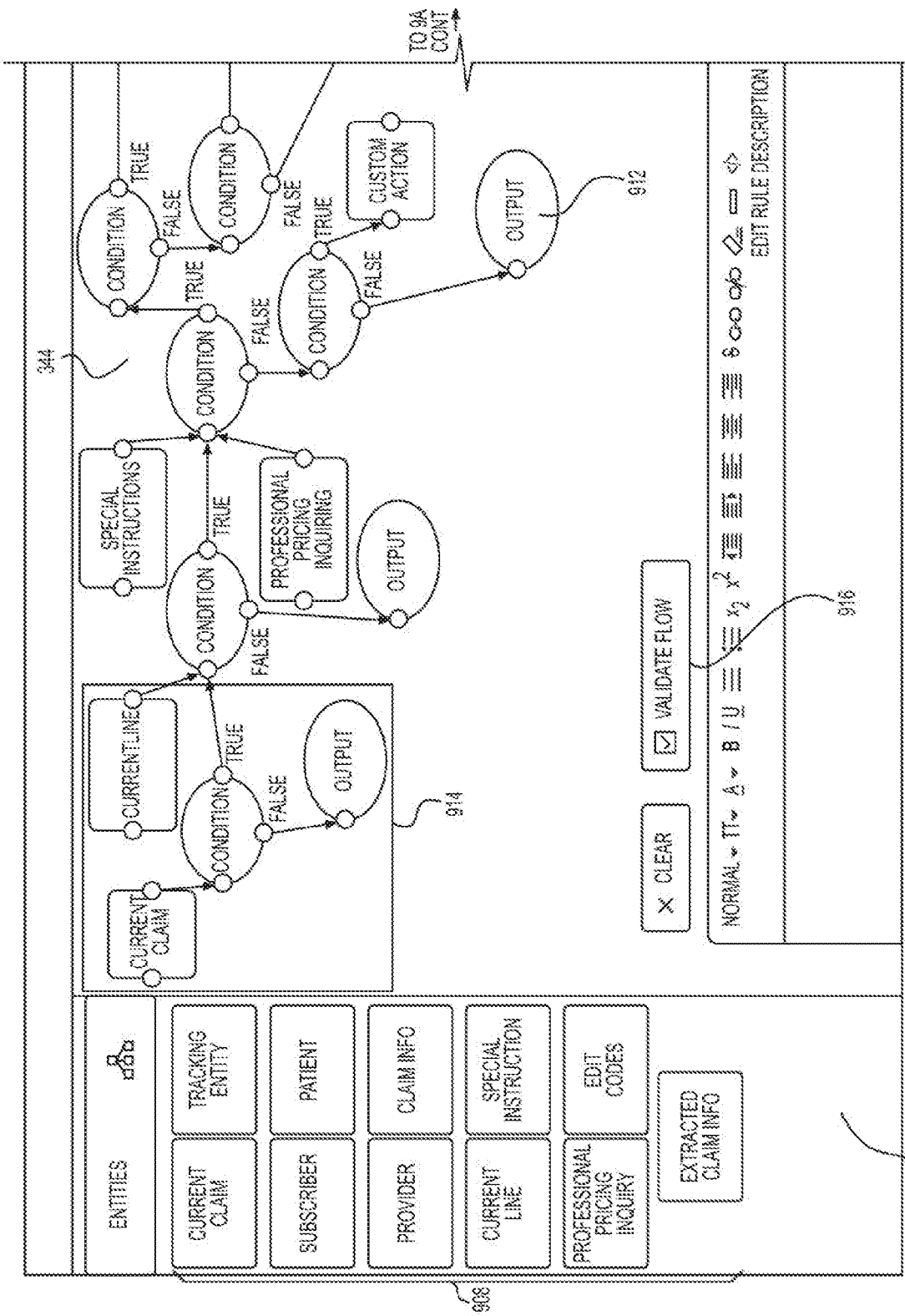
FIG. 9A shows a drag-and-drop graphical user interface (GUI) associated with the rule studio in accordance with the examples disclosed herein.
Figure 9A:
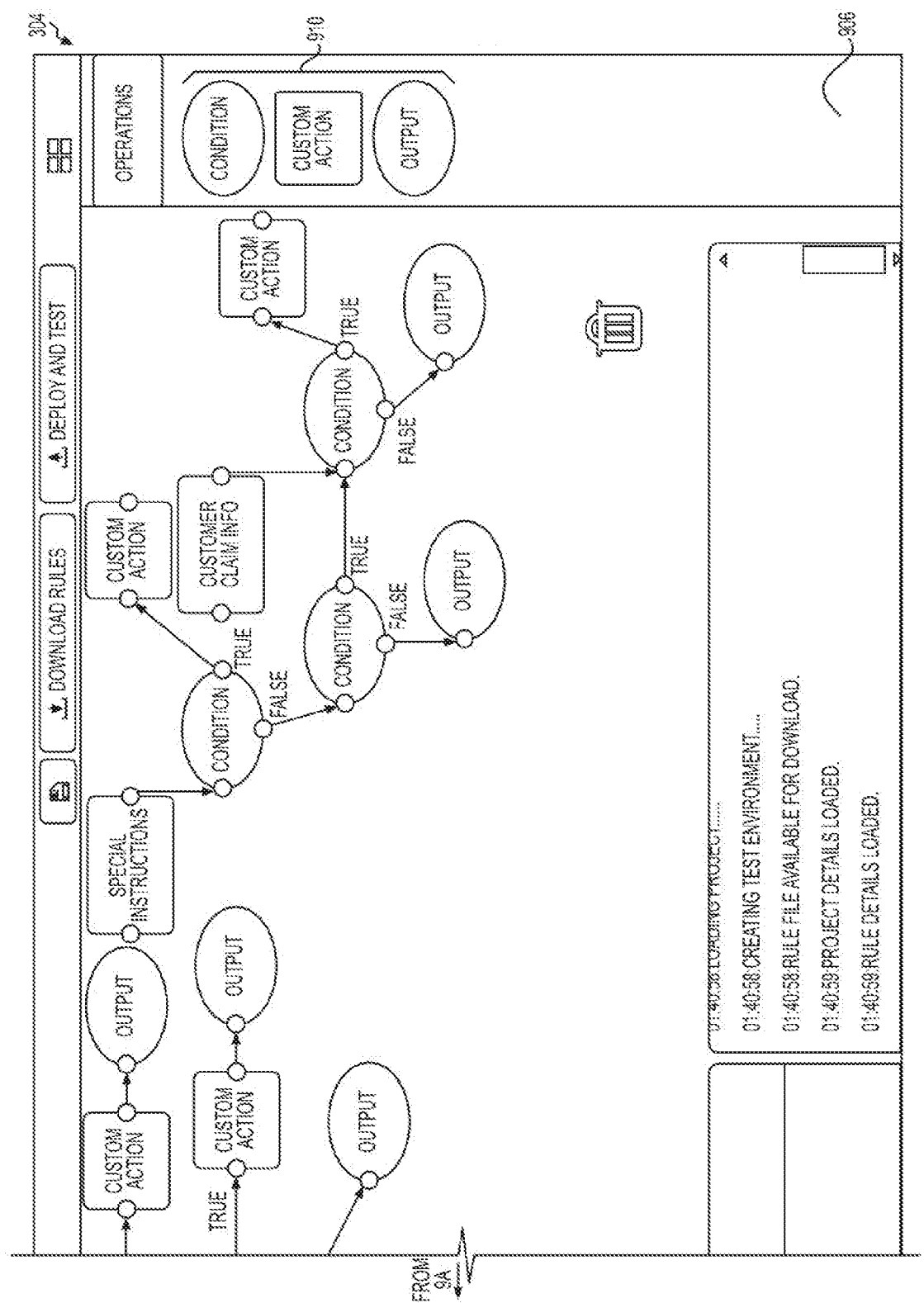

FIG. 9A shows an example of the drag-and-drop GUI 304 associated with the rules studio 140 in accordance with the examples disclosed herein. The drag-and-drop GUI 900 includes an entity panel 902 associated with the entity selector 342, the whiteboard 344 and the operators panel 906 associated with the operator provider 346. The entity panel 902 includes entity elements 908 associated with the various entities from an ontology associated with the health insurance domain. The entities include but are not limited to, current claim, subscriber, provider, patient, extracted claim info and the like. The operators panel 906 includes operator elements 910 such as a condition, a custom action and an output. The rule flow 912 is built by the user by dragging and dropping user selections of the entity elements 908 and the operator elements 910 from the respective panels on to the whiteboard 344. For example, the construct 914 includes a condition operating on the current claim entity wherein if the condition is true, the rule flow 912 specifies another condition along with another entity, current line, to be examined while the condition if false the output is produced. The rule flow 912 thus proceeds until a final condition is examined. The rule flow 912 includes certain custom actions which are made available on the rules studio 140. The validate flow button 916 enables validating the rule flow 912 thereby determining that the rule flow 912 complies with the set of rule requirements 310.

Figure 9B:
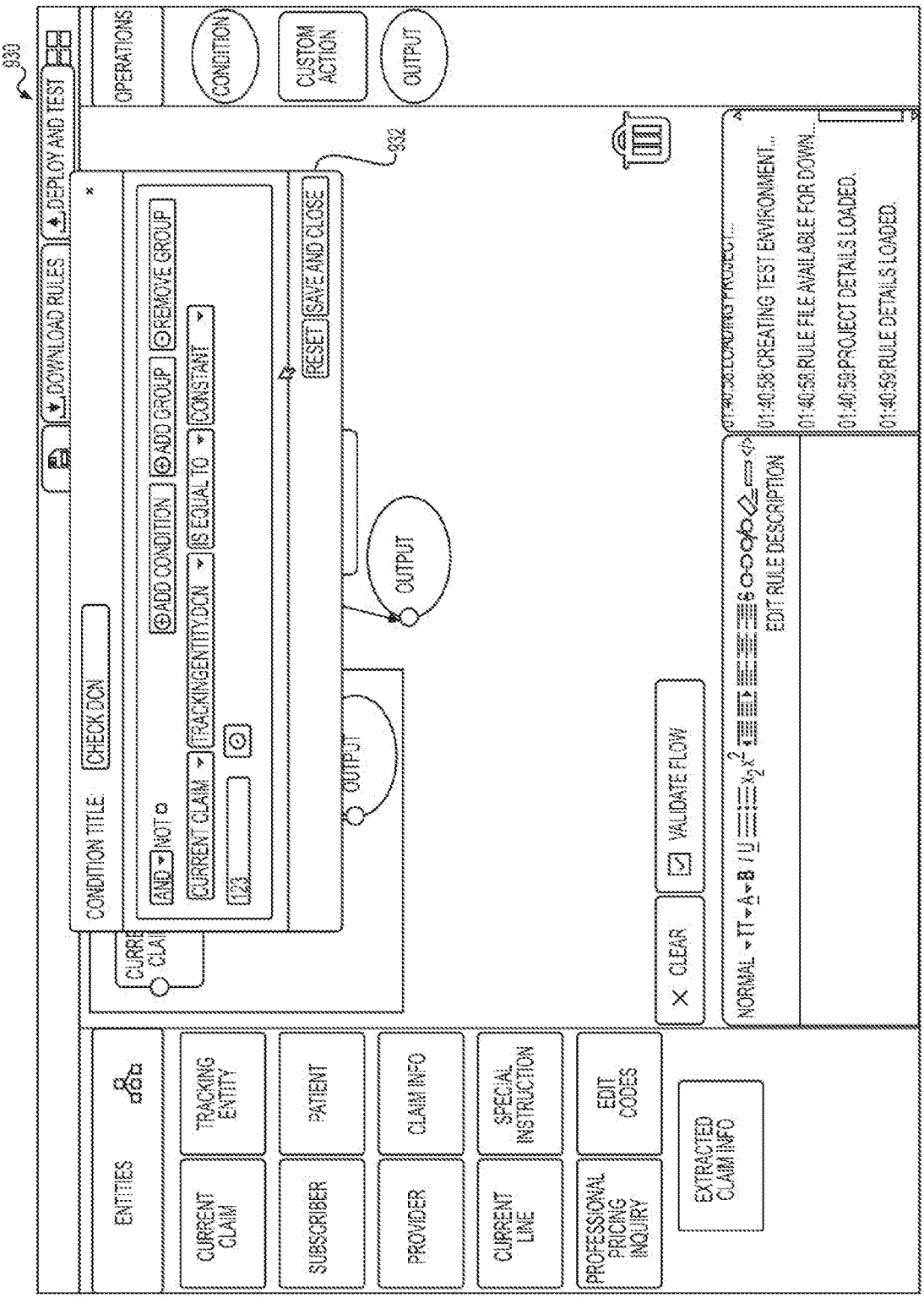
FIG. 9B shows a condition user interface (UI) that is employed by the user to enter the details of a condition to be implemented within the rule flow in accordance with the examples disclosed herein.

FIG. 9B shows the condition UI 930 that is employed by the user to enter the details of a condition to be implemented within the rule flow 912. The condition is to be implemented on the current claim entity to check if an attribute 'DCN' is equal to a constant '123'. Upon entering the condition, the user can click the 'save and close' button 932 in order that the condition is added to the rule flow 912.

Figure 9C:
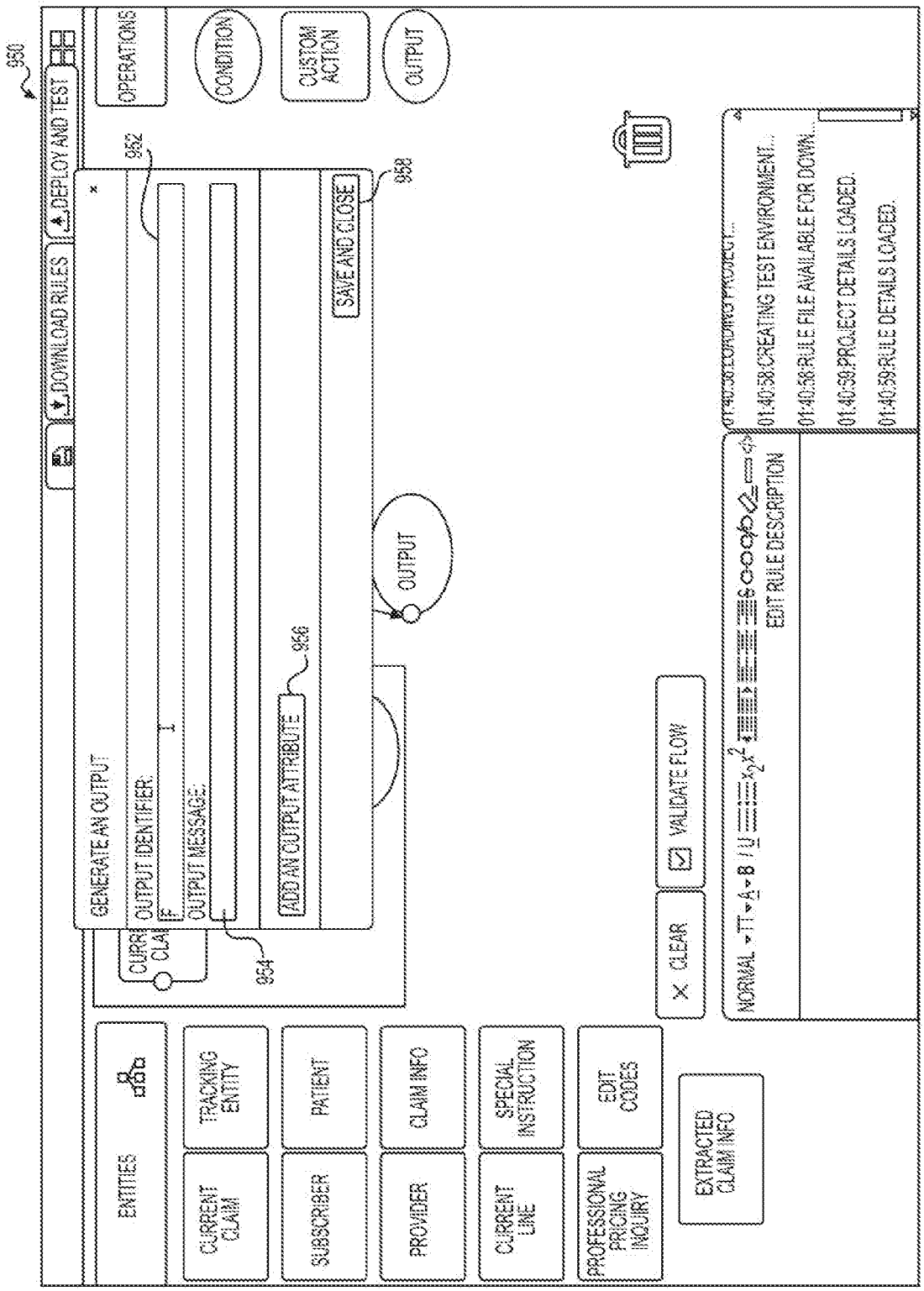
FIG. 9C shows an output GUI that enables the user to define an output to a condition within the rule flow in accordance with the examples disclosed herein.

FIG. 9C shows an output GUI 950 that enables the user to define an output to a condition within the rule flow 912. The output GUI 950 includes an output identifier 952, an output message 954 in addition to enabling the user to add an output attribute via an output attribute button 956. The changes made can be stored via clicking the save and close button 958.

The user interfaces 930 and 950 can be accessed, for example, by double clicking the respective condition element or the output elements in the whiteboard 344.

Figure 10:
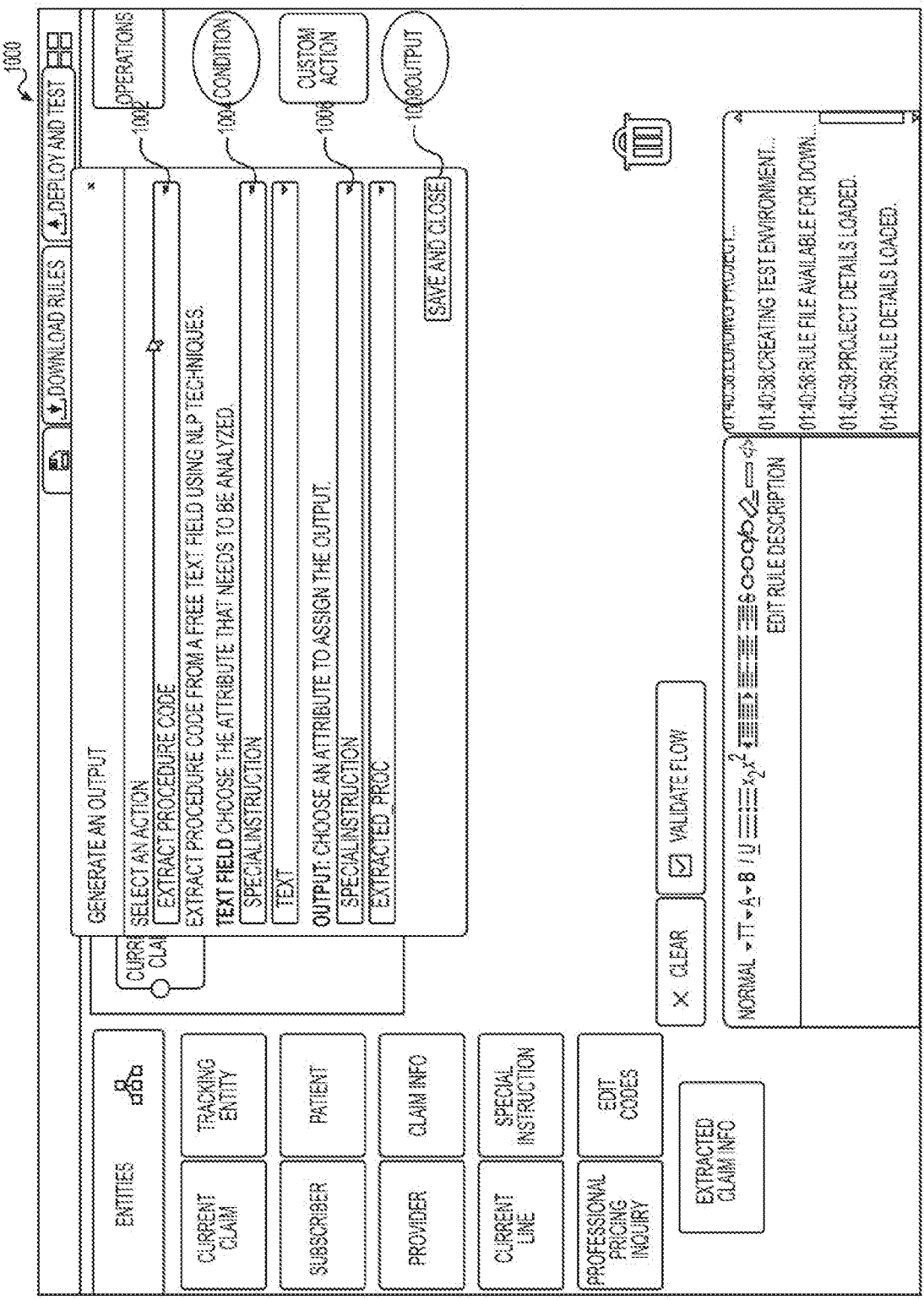
FIG. 10 shows a custom action UI that enables a user to access the custom actions in accordance with the examples disclosed herein.

As mentioned earlier, custom actions can include third-party code modules that enable the rules studio 140 to enable to execute functions associated, for example, with probabilistic rules. By the way of illustration and not limitation, a probabilistic rule can include a condition for which the fulfilment depends on the sentiment of an article. In this case, the custom action(s) can include at least the natural language processing (NLP) of the body of text which is input to the condition and the sentiment analysis associated with the body of text. FIG. 10 shows a custom action UI 1000 that enables a user to access the custom actions provided by the rules studio 140 in accordance with the examples disclosed herein. Certain custom actions can be available for user selection, based for example, on the user's choice of domain for the ontology 102. In this case, based on the domain choice of health insurance, a custom action for extracting the procedure code from a free text field using NLP techniques is available and selected by the user as shown in the selection box 1002. The free text field from which the procedure code is to be extracted is selected in the field selection box 1004. The attribute to assign the output of the custom action is selected at the attribute selection box 1006. The selection of the custom action and the related information is stored under the rule flow 912 upon the user clicking the 'Save and Close' button 1008.

Figure 11:
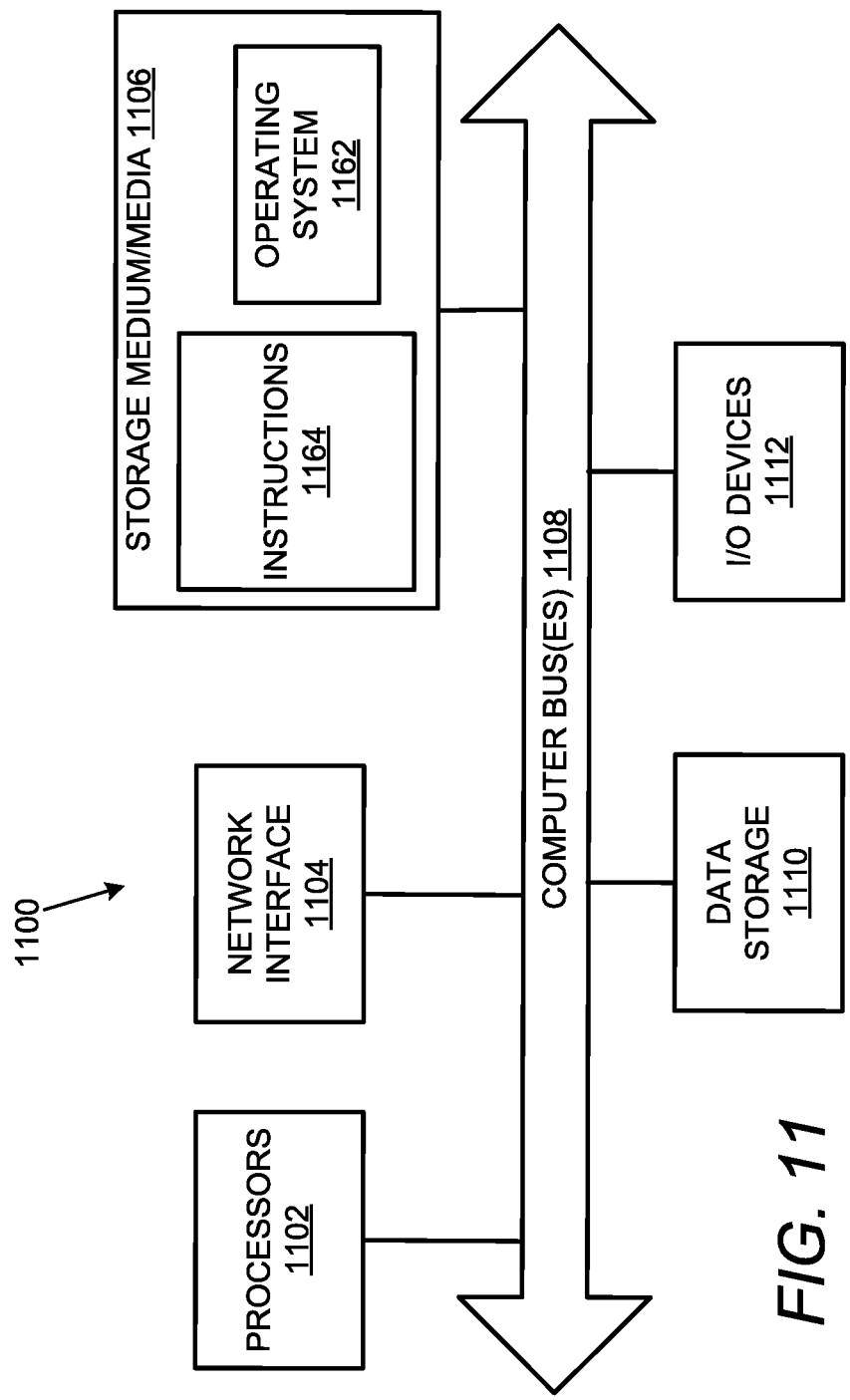
FIG. 11 illustrates a computer system that may be used to implement the rule generation system in accordance with the examples disclosed herein.

FIG. 11 illustrates a computer system 1100 that may be used to implement the rule generation system 100 in accordance with the examples disclosed herein. The computer system 1100 may include additional components not shown and that some of the components described may be removed and/or modified.

The computer system 1100 includes processor(s) 1102, such as a central processing unit, ASIC or other type of processing circuit, input/output devices 1112, such as a display, mouse keyboard, etc., a network interface 1104, such as a Local Area Network (LAN), a wireless 802.16x LAN, a 3G or 4G mobile WAN or a WiMax WAN, and a computer-readable medium 1106. Each of these components may be operatively coupled to a bus 1108. The computer-readable medium 1106 may be any suitable medium which participates in providing instructions to the processor(s) 1102 for execution. For example, the computer-readable medium 1106 may be non-transitory or non-volatile medium, such as a magnetic disk or solid-state non-volatile memory or volatile medium such as RAM. The instructions or modules stored on the computer-readable medium 1106 may include machine readable instructions 1164 executed by the processor(s) 1102 to perform the methods and functions of the rule generation system 110. The computer-readable medium 1106 may also store an operating system 1162, such as MAC OS, MS WINDOWS, UNIX, or LINUX. The operating system 1162 may be multi-user, multiprocessing, multitasking, multithreading, real-time and the like. For example, during runtime, the operating system 1162 is running and the instructions 1164 are executed by the processor(s) 1102.

The computer system 1100 may include a data storage 1110, which may include non-volatile data storage. The data storage 1110 may be used to store data such as but not limited to the entities, attributes of the entities, the ontologies, the rules that are generated, and the like which may be used by rule generation system 100.

The network interface 1104 connects the computer system 1100 to internal systems for example, via a LAN. Also, the network interface 1104 may connect the computer system 1100 to the Internet. For example, the computer system 1100 may connect to web browsers and other external applications and systems via the network interface 1104.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims, and their equivalents, in which all terms are meant in their broadest reasonable sense unless otherwise indicated.

What is claimed is:

1. An Artificial Intelligence (AI) based automatic rule generation system comprising:
at least one processor;
a non-transitory processor readable medium storing machine-readable instructions that cause the at least one processor to:
receive user selection of a domain from a plurality of domains for generation of a domain-specific ontology;
receive information regarding the domain-specific ontology to be generated for the domain, wherein the domain-specific ontology includes entities, attributes of the entities and relationships between the entities;

build the domain-specific ontology via generating code for the domain-specific ontology, the code for the domain-specific ontology establishing a hierarchical structure connecting the entities, the attributes of the entities and the relationships between the entities;

enable access to the domain-specific ontology via a drag-and-drop graphical user interface (GUI), the drag-and-drop GUI including a whiteboard that receives user selections of one or more of the entities and one or more operators that include at least one custom action operator via drag-and-drop operations for the rule generation;

provide access to user-selectable custom actions peculiar to the domain via the at least one custom action operator;

receive, via the drag-and-drop GUI, visual information related to at least the user selections of the entities and the at least one custom action operator to be used for a rule to be generated;

generate a visual interface upon user selection of the at least one custom action operator, the visual interface enables user selections of the user-selectable custom actions;

receive, the user selection of one of the user-selectable custom actions via the visual interface provided by the at least one custom action operator which controls a third-party function transmitting an input of the user-selectable custom action to at least one external system and receives processing output generated in response to the external system acting on the input;

parse the visual information received via the drag-and-drop GUI;

generate code for the rule from the parsed visual information and the received processing output wherein the rule includes a probabilistic rule and the code for the rule includes code of the user-selectable custom action; and publish the rule to an execution server, wherein publishing the rule includes enabling access to the rule to one or more robotic process automation (RPA) procedures via a web service.

2. The rule generation system of claim 1, wherein the machine-readable instructions for generating the code related to building the domain-specific ontology cause the at least one processor to:

provide one or more input graphical user interfaces (GUIs) that enable a user to enter the information related to the entities, the attributes of the entities and the relationships between the entities.

3. The rule generation system of claim 1, wherein the machine-readable instructions for generating the code related to building the domain-specific ontology cause the at least one processor to:

provide one or more update GUIs that enable a user to modify an existing domain-specific ontology.

4. The rule generation system of claim 1, wherein the machine-readable instructions for generating the domain-specific ontology that cause the at least one processor to:

receive the information regarding the domain-specific ontology to be generated via a spreadsheet.

5. The rule generation system of claim 1, wherein the machine-readable instructions for generating the code related to the domain-specific ontology that cause the at least one processor to:

encode the information regarding the ontology into a script.

6. The rule generation system of claim 1, wherein the non-transitory processor readable medium stores further machine-readable instructions that cause the at least one processor to:

convert a rule flow obtained in the visual information pertaining to the rule to be generated into a script using custom grammar.

7. The rule generation system of claim 6, wherein the instructions for parsing the visual information comprise further machine-readable instructions that cause the at least one processor to:

parse the script for generating the rule.

8. The rule generation system of claim 1, wherein the rule is the probabilistic rule that enables generating an output from a received input based on probability of occurrence of one or more outcomes.

9. The rule generation system of claim 1, wherein the instructions for enabling access to the domain-specific ontology further machine-readable instructions that cause the at least one processor to:

enabling display of the entities on an entity pane of the drag-and-drop GUI.

10. The rule generation system of claim 9, enabling display of the operators on an operator pane of the drag-and-drop GUI, the operators providing for outputs and conditions for the rule generation.

11. The rule generation system of claim 1, wherein the domain is healthcare domain that provides for the custom action of extraction of a procedure code from a free text field and an attribute of the at least one custom action operator assigns the procedure code to an output field.

12. The rule generation system of claim 1, wherein the instructions for receiving the user selection of the user-selectable custom action via the at least one custom action operator comprise further machine-readable instructions that cause the at least one processor to:

receiving, user selections of input and output attributes for the user-selectable custom action through the at least one custom action operator.

13. An Artificial Intelligence (AI)-based method of automatic rule generation comprising:

receiving user selection of a domain from a plurality of domains for generation of a domain-specific ontology;

compiling into the domain-specific ontology, user-provided information that includes entities, attributes of the entities and relationships between the entities that are to form an hierarchical structure of the domain-specific ontology;

providing access to the entities of the domain-specific ontology and user-selectable custom actions peculiar to the domain as elements of a drag-and-drop graphical user interface (GUI) wherein the elements include operators that comprise at least one custom action operator providing access to the user-selectable custom actions;

enabling building of a rule flow via drag-and-drop operations on the elements, wherein the elements are dragged and dropped onto a whiteboard of the drag-and-drop GUI;

receiving via the drag-and-drop GUI, user selections of the entities and the at least one custom action operator conveyed via the drag-and-drop operations on the elements;

generating a visual interface upon user selection of the at least one custom action operator;

receiving, the user selection of one of the user-selectable custom actions via the visual interface generated by the at least one custom action operator, wherein the at least one custom action operator controls at least one third-party function that transmits an input of the user-selectable custom action to at least one external system and receives processing output generated in response to the external system acting on the input;

parsing information of the rule flow received from the drag-and-drop GUI regarding the user selections;

determining that the rule flow complies with a set of rule requirements;

generate code for the rule flow from the parsed information and the received processing output;

converting the parsed information of the rule flow into at least one rule, wherein the at least one rule is a probabilistic rule and the code for the at least one rule includes code of the user-selectable custom action; and publishing the at least one rule as a web service for access by robotic process automation (RPA) procedures via a web service.

14. The method of claim 13, further comprising:
transforming data received from the processing output of the external system into a data format associated with a rule generation system that sent the input of the user-selectable custom action.

15. The method of claim 13, further comprising:
receiving the user-provided information from the user in a file or via one or more input graphical user interfaces (GUI)s; and
storing the user-provided information for the compilation into the domain-specific ontology.

16. A non-transitory computer-readable storage medium comprising machine-readable instructions that implement an Artificial Intelligence (AI)-based automatic rule generation by causing a processor to:
receive user selection of a domain from a plurality of domains for generation of a domain-specific ontology;
receive information regarding the domain-specific ontology to be generated for the domain, the domain-specific ontology including entities, attributes of the entities and relationships between the entities;
build the domain-specific ontology via generating code for the domain-specific ontology, the code establishing a hierarchical structure connecting the entities, the attributes of the entities and the relationships between the entities;
enable access to the domain-specific ontology via a drag-and-drop graphical user interface (GUI), the drag-and-drop GUI including a whiteboard that receives user selections of one or more of the entities and one or more operators including at least a custom action operator via drag-and-drop operations;
provide access to user-selectable custom actions peculiar to the domain via the custom action operator;
receive, via the drag-and-drop user interface, visual information related to at least the user selections of the entities and the custom action operator to be used for at least one rule to be generated;
generate a visual interface upon user selection of the custom action operator, the visual interface enables user selections of the user-selectable custom actions;
receive, the user selection of one of the user-selectable custom actions via the visual interface-provided by the custom action operator, which controls at least one third-party function transmitting an input of the user-selectable custom action to at least one external system and receives processing output generated in response to the external system acting on the input;
parse the visual information received via the drag-and-drop interface;
determine that data obtained by parsing the visual information complies with one or more requirements for rule generation;
generate code for the rule from the parsed visual information and the received processing output wherein the rule includes a probabilistic rule and the code for the at least one rule includes code of the user-selectable custom action; and
publish the at least one rule to an execution server, wherein the publishing includes enabling access to the rule to one or more robotic process automation (RPA) procedures via a web service.

* * * * *

UNITED STATES PATENT AND TRADEMARK OFFICE
CERTIFICATE OF CORRECTION

PATENT NO. : 11,531,914 B2
APPLICATION NO. : 16/105470
DATED : December 20, 2022
INVENTOR(S) : Soujanya Soni, Madhura Shivaram and Aishwarya Kaliki It is certified that error appears in the above-identified patent and that said Letters Patent is hereby corrected as shown below:

In the Claims

At Claim 16, Column 14, Line 22, the phrase "visual interface-provided" should instead read "visual interface provided".

Signed and Sealed this
Eighth Day of August, 2023

Katherine Kelly Vidal
*Director of the United States Patent and Trademark Office*